Dec. 18, 1962 R. D. BAUER 3,069,483
ISOBUTANE STRIPPER-DEPROPANIZER OPERATION
Filed March 11, 1960
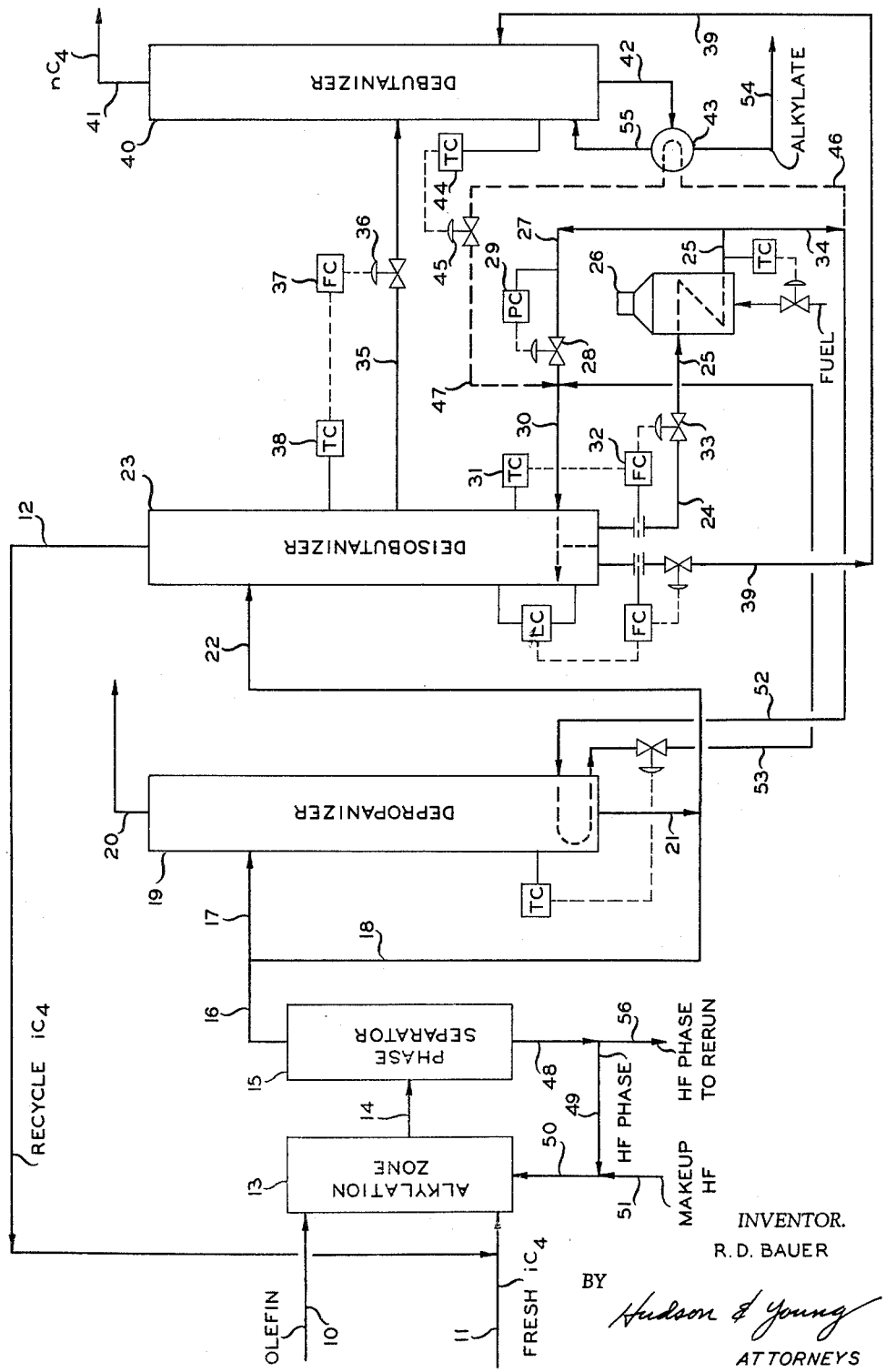
INVENTOR.
R. D. BAUER
BY
*Hudson & Young*
ATTORNEYS 3,069,483
ISOBUTANE STRIPPER-DEPROPANIZER
OPERATION
Robert D. Bauer, Bartlesville, Okla., assignor to Phillips Petroleum Company, a corporation of Delaware
Filed Mar. 11, 1960, Ser. No. 14,391
7 Claims. (Cl. 260—683.48)

This invention relates broadly to an improved alkylation process. In accordance with one aspect, this invention relates to an improved process for the separation of the hydrocarbon effluent in the alkylation of isoparaffinic hydrocarbons with olefinic hydrocarbons. In accordance with another aspect, this invention relates to an improved fractionation arrangement employed for the separation of the effluent from an HF alkylation process wherein a low level of inerts in the process is maintained.

The catalytic alkylation of an isoparaffin with an olefin to form gasoline boiling range materials is well known in the art. Also, it is well known to subject the hydrocarbon effluent from such a process to a series of separations which generally involve fractional distillation. The separation of various fractions from the alkylation zone hydrocarbon effluent, and particularly separation of the lighter inert materials, presents problems of considerable concern in the industry. Also, from an economical standpoint in particular, it is desirable to recycle unreacted isoparaffin to the alkylation zone. However, with many of the prior art separation systems excessive build-up of inert materials such as propane in the system is experienced due to these materials being recycled with the isoparaffin. As is known in the art, the presence of inert materials in the alkylation zone appreciably decreases the efficiency of the alkylation reaction. The present invention is directed to an improved separation system for an alkylation hydrocarbon effluent wherein build-up of inerts in the system is minimized.

Accordingly, an object of this invention is to provide an improved process for the separation of materials from an alkylation zone hydrocarbon effluent whereby a material saving in operating and equipment costs is obtained.

Another object of this invention is to minimize the build-up of inert materials in an alkylation process.

Still another object of this invention is to provide an improved process for the alkylation of isoparaffins with olefins.

Other aspects, objects as well as the several advantages of the invention are apparent from a study of the disclosure, the drawing, and the appended claims.

In accordance with the present invention, I divide the hydrocarbon effluent recovered from an alkylation process and pass a portion of the divided effluent to a first fractionation zone wherein materials lower boiling than propane and propane are recovered overhead and removed from the process, thereby maintaining a low level of inerts such as propane in the system. The remainder of the divided effluent is passed directly along with the produced depropanized bottoms from the first zone to a second fractionation zone or isobutane stripper. Hydrocarbon lower boiling than isobutane and isobutane are recovered overhead from the second zone and preferably recycled directly to the alkylation zone. A bottoms fraction comprising n-butane and alkylate can be passed to a third fractionation zone wherein a further separation of hydrocarbons is made.

By the practice of my invention, the size requirements of my isobutane stripper or second fractionation zone can be materially decreased. Also, the build-up of inert materials, especially propane, is minimized by depropanizing only a portion of the alkylation zone hydrocarbon effluent.

A better understanding of the present invention will be obtained upon reference to the accompanying diagrammatic flow sheet illustrating the invention in a preferred embodiment in an HF alkylation process.

Referring now to the drawing, an olefin charge composed essentially of butylenes and some propylene is passed by way of pipe 10 to alkylation zone 13. Fresh isobutane in pipe 11 and recycle isobutane in conduit 12 are also introduced into alkylation zone 13 wherein, under usual alkylation conditions, alkylation ensues. Hydrofluoric acid catalyst is introduced to alkylation zone 13 by way of pipes 51 and 50. Recycle hydrofluoric acid is introduced into conduit 50 by way of pipes 48 and 49. A portion of a recycle HF acid is passed to a rerun unit not shown by way of pipe 56. The product-emulsion formed in zone 13 is passed to conventional settler or separator 15 by way of pipe 14. The acid phase is removed and recovered via line 48 and returned by pipes 49 and 50 to alkylation zone or contactor 13.

In accordance with the present invention, a portion of the hydrocarbon phase recovered from separator 15 is passed by way of pipes 16 and 17 to depropanizer 19, the overhead of which is removed by way of pipe 20 from the process. The remainder of the hydrocarbon phase removed from separator 15 need not be subjected to depropanization and can bypass fractionator 19 by way of conduit 18. A depropanizer bottoms stream is removed by pipe 21 and this stream combined with the stream in pipe 18, and the combined stream is passed to deisobutanizer 23 by way of conduit 22.

By operating in accordance with my invention, the size requirement for my deisobutanizer is materially decreased because part of the lighter materials are removed overhead from depropanizer 19. Also, build-up of inert materials such as propane is minimized in accordance with my invention since a portion of these materials is continuously removed from the system as overhead from depropanizer 19. The amount of hydrocarbon feed passed to depropanizer 19 by way of conduit 17 will be sufficient to rid the system of propane to maintain a low level of propane in the system. Generally, about 40% of the total hydrocarbon phase recovered from separator 15 will be subjected to depropanization. Isobutane and lighter materials are removed overhead from deisobutanizer 23 by way of pipe 12 and recycled to alkylation zone 13. Bottoms from deisobutanizer 23 containing normal butane and alkylate is removed by conduit 39. A portion of the deisobutanizer bottoms is passed through conduit 25, control valve 33 and introduced into fired heater 26 wherein the temperature of the bottoms fraction is increased efficiently to decompose organic fluorine compounds present and to impart to this a quantity of heat above that required to reboil a deisobutanizer. The bottoms fraction is heated in heater 26 to within a temperature range of about 325 to about 550° F. and preferably between about 375 and about 475° F.

As disclosed and claimed in copending application Serial No. 14,392, filed March 11, 1960, a portion of the bottoms fraction heated in heating zone 26 is returned directly to deisobutanizer 23 by way of conduits 27 and 30. The remainder of the heated bottoms fraction not returned directly to the deisobutanizer 23 is passed by way of conduits 34 and 52 to depropanizer 19 to serve as reboiler heat. The partially cooled bottoms stream is returned from depropanizer 19 by way of conduits 53 and 30 to deisobutanizer 23.

Optionally, but nevertheless, as an important feature of the above-noted application, at least a portion of the heated bottoms in conduit 34 can be passed by way of pipe 46 shown in dotted lines and passed to reboiler 43. The partially cooled stream is returned from reboiler 43 by way of control valve 45, conduit 47 and pipe 30 and introduced into deisobutanizer 23 as previously described. Control valve 45 is regulated by temperature controller 44 which senses the temperature in debutanizer 40.

The remaining portion of the bottoms fraction removed from deisobutanizer 23 not passed to heater 26 is passed by way of conduit 39 directly to debutanizer 40. Also, in accordance with the above-noted application, a vaporous side stream comprising normal butane is removed from an intermediate portion of deisobutanizer 23 by way of conduit 35 and passed to debutanizer 40. The amount of vaporous withdrawal is controlled by temperature or analytical controller 33, flow controller 37 and control valve 36. A normal butane stream is recovered overhead from debutanizer 40 by way of conduit 41. A bottom alkylate product is removed from debutanizer 40 by way of conduit 42 and passed to reboiler 43 and a portion returned to debutanizer 40 by way of conduit 55. Alkylate product is removed from the process by way of conduit 54.

In actual operation, by removing a portion of the vaporous light materials from an intermediate portion of deisobutanizer 23 by way of conduit 35 the bubble point of the deisobutanizer bottoms passed through heater 26 is increased and therefore the bottoms stream can be heated to a higher temperature and thereby undergo a higher degree of thermal defluorination. Also, by cooling at least a portion of the effluent from heating zone 26, as shown, higher circulation rates and temperatures on the deisobutanizer bottom stream being heated can be obtained thereby improving thermal defluorination.

Assuming feed to tower 23 to increase at a constant quality, the tower bottom temperature will begin to lower. This, via temperature controller 31, will actuate flow controller 32 to effect further opening of valve 33, which, in turn, increases the amount of bottoms fed to heater 26. As additional bottoms material is passed through furnace 26, additional fuel is charged to the furnace in response to the furnace effluent temperature, and additional vaporization of liquid takes place in heater 26. The amount of heat imparted to the bottoms fraction passed through the heater will be more heat than required for reboiler heat in deisobutanizer 23. The additional heat present in the effluent from furnace 26 is advantageously used as reboiler heat in either depropanizer 19 or debutanizer 40, as shown. A vaporous side stream comprising essentially normal butane is removed by conduit 35. The amount of normal butane removed from deisobutanizer 23 is controlled by temperature controller 38 which senses the column temperature. The column temperature will vary depending upon the amount of vaporous material returned by conduit 30 and condensed in column 23 to give up its latent heat.

The following is a specific example of operation according to the above description.

In a specific example using my process, the contactor 13 is operated at 90° F., and at a pressure sufficient to maintain a liquid phase. The isobutane to olefin mole ratio is 5:1, and the volume ratio of hydrocarbon to catalyst is 1:1. Each barrel of olefin reacts with 1.3 barrels of isobutane to produce 1.7 barrels of total alkylate. The olefin stream 10 is introduced at 90° F., the recycle acid at 90° F. and the isobutane at 90° F. The separator surge is operated at 90° F., and pressure to maintain liquid phase.

Following are the conditions of pressure and temperature obtained in the depropanizer, the deisobutanizer, and the debutanizer.

| | Depropanizer Column 19 | Deisobutanizer Column 23 | Debutanizer Column 40 |
|---|---|---|---|
| Top pressure p.s.i.g | 285 | 115 | 85 |
| Top temperature, °F | 136 | 140 | 143 |
| Bottom pressure p.s.i.g | 290 | 120 | 90 |
| Bottom temperature, °F | 233 | 275 | 336 |

NOTE.—Fired heater, 26; outlet pressure, 340 p.s.i.g.; outlet temperature, 425° F.

In the following table, the composition of the various flow streams shown on the drawing are tabulated.

*Table*

| Stream No | 10 | 11 | 12 | 16 | 17 | 18 | 21 | 22 | 39 | 24 | 27 | 52 | 30 | 35 | 20 | 41 | 54 |
|---|---|---|---|---|---|---|---|---|---|---|---|---|---|---|---|---|---|
| Stream B/D component | Olefin charge | Fresh isobutane | Recycle isobutane | Reactor hydrocarbon effluent | Charge to depropanizer | Portion to isobutane stripper | Depropanizer bottoms | Charge to isobutane stripper | Isobutane bottom yield | Isobutane bottom to furnace | Direct furnace effluent to isobutane stripper | Furnace effluent to reboil depropanizer tower | Total to reboil deisobutanizer column | Side draw | Depropanizer overhead yield | Debutanizer overhead yield | Debutanizer alkylate yield |
| $C_3^=$ | 1,845 | | | | | | | | | | | | | | | | |
| $C_3$ | 1,221 | 50 | 2,520 | 3,976 | 1,533 | 2,443 | 77 | 2,520 | | | | | | | 1,456 | | |
| $C_4^=$ | 2,835 | | | | | | | | | | | | | | | | |
| $iC_4$ | 2,277 | 4,072 | 41,023 | 41,225 | 15,897 | 25,328 | 15,875 | 41,203 | 20 | 180 | 122 | 53 | 180 | 160 | 22 | 180 | |
| $nC_4$ | 1,757 | 175 | 6,613 | 8,545 | 3,295 | 5,250 | 3,295 | 8,545 | 332 | 2,988 | 2,032 | 956 | 2,988 | 1,600 | | 1,842 | 90 |
| $iC_5$ | 95 | 100 | 250 | 855 | 330 | 525 | 330 | 855 | 587 | 5,283 | 3,593 | 1,690 | 5,283 | 18 | | | 605 |
| LA | | | 20 | 7,660 | 2,954 | 4,706 | 2,954 | 7,660 | 7,638 | 68,742 | 46,745 | 21,997 | 68,742 | 2 | | | 7,640 |
| HA | | | | 405 | 156 | 249 | 156 | | 405 | 3,645 | 2,479 | 1,166 | 3,645 | | | | 405 |
| HF | | | 221 | 359 | 138 | 221 | (1) | 221 | (2) | (1) | (1) | (1) | (1) | | 138 | (2) | (2) |
| Total | 10,080 | 4,397 | 50,647 | 63,025 | 24,303 | 38,722 | 22,687 | 61,409 | 8,982 | 80,838 | 54,971 | 25,867 | 80,838 | 1,780 | 1,616 | 2,022 | 8,740 |

[1] Not measurable as barrels, present as p.p.m. fluorides.   [2] Negligible fluorides.

These data illustrate a specific plant operation wherein of the 63,025 barrels per day hydrocarbon effluent from separator 15, 24,303 barrels per day are charged to the depropanizer to remove 1616 barrels per day light materials (propane and lighter), and the remaining 38,722 barrels per day plus 22,687 barrels per day depropanizer bottoms are charged combined to the isobutane removal column.

Among the advantages of operating according to this specific example of my invention as compared to the prior art and methods are that a much smaller isobutane removal column can be employed while maintaining low quantity of these light inert hydrocarbons in the recycle isobutane and, hence, low quantity of these inerts in the alkylation system, such low quantities being essential for efficient operation.

It will be understood by one skilled in the art in possession of this disclosure that the drawing is essentially schematic in character and that certain pieces of equipment and/or details thereof have been omitted for the sake of simplicity. Such details will be routinely supplied by one skilled in the art in possession of this disclosure. Furthermore, detail conditions of operation as they may apply to certain embodiments of the invention which can be routinely supplied by one skilled in the art, have not been herein elaborated also for sake of simplicity.

While preferred embodiments of this invention have been disclosed, the description is intended to be illustrative only and it is to be understood that changes and variations can be made without departing from the spirit and scope of the invention as defined by the appended claims.

I claim:

1. An improved process for the separation of the hydrocarbon effluent from an alkylation process which comprises passing a portion of said effluent to a first separation zone wherein lower boiling materials are separated overhead and removed from the process, thereby minimizing the build-up of inerts in the process, removing from a lower portion of said first zone a liquid hydrocarbon portion reduced in lower boiling materials, passing said liquid fraction and the remainder of said effluent to a second separation zone wherein isoparaffin is separated overhead, and withdrawing a second liquid hydrocarbon fraction from a lower portion of said second zone as a product of the process.

2. Process according to claim 1 wherein overhead from said first zone comprises propane.

3. Process according to claim 2 wherein said isoparaffin is isobutane.

4. An improved process for the separation of the hydrocarbon effluent from an alkylation process which comprises dividing said effluent, passing a portion of said effluent to a first fractionation zone wherein materials lighter than propane and propane are recovered overhead and removed from the process, thereby maintaining a low level of propane in the process, withdrawing from a lower portion of said first zone an at least partially depropanized liquid hydrocarbon fraction, passing said depropanized fraction and the remainder of said effluent directly to a second fractionation zone wherein isoparaffin is separated overhead and recycled to said alkylation, withdrawing an at least partially deisobutanized liquid hydrocarbon fraction from a lower portion of said second zone, and passing said deisobutanized fraction to a third fractionation zone wherein a further separation of hydrocarbons is made.

5. Process according to claim 4 wherein said alkylation is carried out in the presence of a hydrofluoric acid catalyst.

6. Process according to claim 5 wherein said isoparaffin is isobutane.

7. A process which comprises introducing a portion of the hydrocarbon effluent from the alkylation of a low boiling olefin with isobutane in the presence of a hydrofluoric acid catalyst into a first fractionation zone wherein hydrocarbons lower boiling than propane and propane are separated overhead and removed from the process, thereby maintaining a low level of propane in the process, withdrawing from a lower portion of a said first zone a depropanized liquid hydrocarbon fraction, combining said depropanized fraction and the remainder of said effluent, introducing said combined fractions directly into a second fractionation zone wherein isobutane is separated overhead and recycled to said alkylation, withdrawing from a lower portion of said second zone a deisobutanized liquid hydrocarbon fraction, and passing said deisobutanized fraction to a third fractionation zone wherein a further separation of hydrocarbons is made.

References Cited in the file of this patent

UNITED STATES PATENTS

| | | |
|---|---|---|
| 2,342,364 | Parker | Feb. 22, 1944 |
| 2,363,171 | Francis | Nov. 21, 1944 |
| 2,382,067 | Kniel | Aug. 14, 1945 |
| 2,542,927 | Kelley | Feb. 20, 1951 |
| 2,865,971 | Beavon | Dec. 23, 1958 |
| 2,938,061 | Smith | May 24, 1960 |